(12) United States Patent
Wood (10) Patent No.: US 7,497,502 B2
(45) Date of Patent: Mar. 3, 2009

(54) MINI SKIRT AERODYNAMIC FAIRING DEVICE FOR REDUCING THE AERODYNAMIC DRAG OF GROUND VEHICLES

(75) Inventor: Richard Wood, Virginia Beach, VA (US)

(73) Assignee: Solus Solutions and Technologies, LLC, Virginia Beach, VA (US)

( * ) Notice: Subject to any disclaimer, the term of this patent is extended or adjusted under 35 U.S.C. 154(b) by 0 days.

(21) Appl. No.: 11/811,541

(22) Filed: Jun. 11, 2007

(65) Prior Publication Data

US 2008/0093887 A1    Apr. 24, 2008

Related U.S. Application Data

(60) Provisional application No. 60/814,303, filed on Jun. 19, 2006.

(51) Int. Cl.
*B60R 27/00* (2006.01)

(52) U.S. Cl. .................... 296/180.4; 296/180.1

(58) Field of Classification Search ............. 296/180.1, 296/180.2, 180.3, 180.4, 180.5
See application file for complete search history.

(56) References Cited

U.S. PATENT DOCUMENTS

| | | | |
|---|---|---|---|
| 2,569,983 A | 10/1951 | Favre | |
| 2,605,119 A * | 7/1952 | Earnest | ........................ 280/849 |
| 2,737,411 A | 3/1956 | Potter | |
| 3,010,754 A | 11/1961 | Schumaker | |
| 3,348,873 A | 10/1967 | Saunders | |
| 3,415,566 A | 12/1968 | Kerrigan | |
| 3,697,120 A | 10/1972 | Saunders | |
| 3,834,572 A | 9/1974 | Eskenazi | |
| 3,854,769 A | 12/1974 | Saunders | |
| 3,866,967 A | 2/1975 | Landry et al. | |
| 3,934,922 A | 1/1976 | MacCready, Jr. et al. | |
| 3,945,677 A | 3/1976 | Servais et al. | |
| 3,960,402 A | 6/1976 | Keck | |
| 3,971,586 A | 7/1976 | Saunders | |
| 3,999,797 A | 12/1976 | Kirsch et al. | |
| 4,006,932 A | 2/1977 | McDonald | |
| 4,021,069 A | 5/1977 | Hersh | |
| 4,030,779 A | 6/1977 | Johnson | |
| 4,035,013 A | 7/1977 | Abbott, III | |
| 4,068,883 A | 1/1978 | Meinecke et al. | |
| 4,113,299 A | 9/1978 | Johnson et al. | |
| 4,131,309 A | 12/1978 | Henke | |
| 4,142,755 A | 3/1979 | Keedy | |

(Continued)

FOREIGN PATENT DOCUMENTS

DE           3115742 A1     11/1982

(Continued)

*Primary Examiner*—Joseph D Pape
(74) *Attorney, Agent, or Firm*—Williams Mullen; M. Bruce Harper (57) ABSTRACT

A device for the reduction of aerodynamic drag and for improved performance and stability of ground vehicles by reducing the mass and velocity of the flow passing under a vehicle is described. The device is particularly suited for a tractor-trailer truck system that includes a motorized lead vehicle pulling one or more non-motorized vehicles. The device is designed to control the flow from entering the undercarriage region from the side of a trailer of a tractor-trailer truck system.

20 Claims, 10 Drawing Sheets

U.S. PATENT DOCUMENTS

| | | | |
|---|---|---|---|
| 4,170,378 A | 10/1979 | Jacobsen | |
| 4,210,354 A | 7/1980 | Canning | |
| 4,214,787 A | 7/1980 | Chain | |
| 4,257,640 A | 3/1981 | Wiley | |
| 4,257,641 A | 3/1981 | Keedy | |
| 4,269,444 A | 5/1981 | Emory | |
| 4,284,302 A | 8/1981 | Drews | |
| 4,310,192 A | 1/1982 | Fitzgerald | |
| 4,316,630 A | 2/1982 | Evans | |
| 4,318,566 A | 3/1982 | Fitzjarrell | |
| 4,320,920 A | 3/1982 | Goudy | |
| 4,343,506 A | 8/1982 | Saltzman | |
| 4,360,232 A | 11/1982 | Elder | |
| 4,386,801 A | 6/1983 | Chapman et al. | 280/107 |
| 4,401,338 A | 8/1983 | Caldwell | |
| 4,433,865 A | 2/1984 | Crompton, Jr. | |
| 4,451,074 A | 5/1984 | Scalon | |
| 4,455,045 A | 6/1984 | Wheeler | |
| 4,458,936 A | 7/1984 | Mulholland | |
| 4,468,060 A | 8/1984 | Fitzgerald et al. | |
| 4,486,046 A | 12/1984 | Whitney et al. | 296/180.4 |
| 4,508,380 A | 4/1985 | Sankrithi | |
| 4,553,781 A | 11/1985 | Johnson | |
| 4,601,508 A | 7/1986 | Kerian | |
| 4,611,847 A | 9/1986 | Sullivan | 296/180.2 |
| 4,640,541 A | 2/1987 | Fitzgerald et al. | 296/180.1 |
| 4,682,808 A | 7/1987 | Bilanin | |
| 4,688,841 A | 8/1987 | Moore | |
| 4,702,509 A | 10/1987 | Elliott, Sr | |
| 4,706,910 A | 11/1987 | Walsh et al. | |
| 4,741,569 A | 5/1988 | Sutphen | |
| 4,746,160 A | 5/1988 | Wiesemeyer | 296/180.2 |
| 4,756,256 A | 7/1988 | Rains et al. | |
| 4,789,117 A | 12/1988 | Paterson et al. | |
| 4,813,635 A | 3/1989 | Paterson et al. | |
| 4,818,015 A | 4/1989 | Scalon | |
| 4,830,315 A | 5/1989 | Presz et al. | |
| 4,867,397 A | 9/1989 | Pamadi et al. | |
| 4,978,162 A | 12/1990 | Labbe | |
| D317,425 S | 6/1991 | Vysotsky et al. | D12/97 |
| 5,058,837 A | 10/1991 | Wheeler | |
| 5,058,945 A | 10/1991 | Elliott et al. | |
| 5,236,347 A | 8/1993 | Andrus | |
| 5,240,306 A | 8/1993 | Flemming | |
| 5,277,444 A | 1/1994 | Stropkay | 280/848 |
| 5,280,990 A | 1/1994 | Rinard | 296/180.1 |
| 5,322,340 A | 6/1994 | Sato et al. | 296/180.1 |
| 5,332,280 A | 7/1994 | DuPont et al. | |
| 5,348,366 A | 9/1994 | Baker et al. | |
| 5,374,013 A | 12/1994 | Bassett et al. | |
| 5,375,903 A | 12/1994 | Lechner | |
| D354,726 S | 1/1995 | Fitzgerald et al. | D12/181 |
| 5,487,586 A | 1/1996 | Kinkaide | |
| 5,498,059 A | 3/1996 | Switlik | |
| 5,513,893 A | 5/1996 | Nakata et al. | 296/180.1 |
| 5,536,062 A | 7/1996 | Spears | |
| 5,609,384 A | 3/1997 | Loewen | 296/180.4 |
| 5,685,597 A | 11/1997 | Reid | |
| 5,791,724 A | 8/1998 | Wasley | |
| 5,823,610 A | 10/1998 | Ryan et al. | |
| 5,887,280 A | 3/1999 | Waring | |
| 5,908,217 A | 6/1999 | Englar | |
| 5,921,617 A | 7/1999 | Loewen et al. | 296/180.4 |
| 5,947,548 A | 9/1999 | Carper et al. | |
| D415,085 S | 10/1999 | Fitzgerald | |
| 6,092,861 A | 7/2000 | Whelan | |
| 6,131,853 A | 10/2000 | Bauer et al. | |
| 6,257,654 B1 | 7/2001 | Boivin | |
| 6,276,636 B1 | 8/2001 | Krastel | |
| 6,286,892 B1 | 9/2001 | Bauer et al. | |
| 6,286,894 B1 | 9/2001 | Kingham | |
| 6,309,010 B1 | 10/2001 | Whitten | |
| 6,409,194 B1 | 6/2002 | Voas | |
| 6,409,252 B1 | 6/2002 | Andrus | |
| 6,412,853 B1 | 7/2002 | Richardson | |
| 6,457,766 B1 | 10/2002 | Telnack | |
| 6,467,833 B1 | 10/2002 | Travers | |
| 6,485,087 B1 | 11/2002 | Roberte et al. | |
| 6,502,383 B1 | 1/2003 | Janardan et al. | |
| 6,595,578 B1 | 7/2003 | Calsoyds et al. | |
| 6,616,218 B2 | 9/2003 | Bauer et al. | |
| 6,634,700 B1 | 10/2003 | Clavert | |
| 6,644,720 B2 | 11/2003 | Long et al. | 296/180.4 |
| 6,666,498 B1 | 12/2003 | Whitten | |
| 6,702,364 B2 | 3/2004 | Neel | |
| 6,742,616 B2 | 6/2004 | Leban | |
| 6,789,839 B1 | 9/2004 | Samuelson | |
| 6,799,791 B2 | 10/2004 | Reiman et al. | |
| 6,854,788 B1 | 2/2005 | Graham | |
| 6,877,793 B2 | 4/2005 | Cory | |
| 6,886,882 B2 | 5/2005 | Farlow et al. | |
| 6,899,369 B2 | 5/2005 | Neel | |
| 6,959,958 B2 | 11/2005 | Basford | |
| 6,974,178 B2 | 12/2005 | Ortega et al. | 296/180.1 |
| 6,979,049 B2 | 12/2005 | Ortega et al. | |
| 7,008,004 B2 | 3/2006 | Ortega et al. | |
| 7,008,005 B1 | 3/2006 | Graham | |
| 7,073,845 B2 | 7/2006 | Ortega et al. | |
| 7,093,889 B2 | 8/2006 | Graham | 296/180.4 |
| 7,100,969 B2 | 9/2006 | Choi et al. | |
| 7,104,591 B1 | 9/2006 | Sanns | |
| 7,147,270 B1 | 12/2006 | Andrus et al. | |
| 7,152,908 B2 | 12/2006 | Shahbazi | |
| 7,255,387 B2 | 8/2007 | Wood | |
| 2002/0021023 A1 | 2/2002 | Leban | 296/180.4 |
| 2003/0205913 A1 | 11/2003 | Leonard | |
| 2006/0232102 A1 | 10/2006 | Steel | |

FOREIGN PATENT DOCUMENTS

| | | |
|---|---|---|
| GB | 2063799 A | 6/1981 |
| GB | 2098558 A | 11/1982 |
| JP | 11115830 | 4/1999 |
| WO | WO2004062953 | 7/2004 |

\* cited by examiner

FIG. 9b

MINI SKIRT AERODYNAMIC FAIRING DEVICE FOR REDUCING THE AERODYNAMIC DRAG OF GROUND VEHICLES

CROSS-REFERENCE TO RELATED APPLICATION

This application claims the benefit of U.S. Provisional Application No. 60/814,303, filed Jun. 19, 2006, the entire content of which is incorporated herein by reference.

ORIGIN OF THE INVENTION

The invention described herein was made by employees of the United States Government, and may be manufactured and used by or for the Government without payment of any royalties thereon or therefore.

FIELD OF THE INVENTION

The invention relates to the reduction of aerodynamic drag for moving ground vehicles; specifically to an improved method and device for the reduction of aerodynamic drag and for improved performance and stability of ground vehicles by reducing the mass and velocity of the flow passing under a vehicle.

BACKGROUND OF THE INVENTION

The flow passing under a ground vehicle imparts a drag force to the vehicle when it impinges on and flows around the vehicle undercarriage components, landing gear, axels, brake components, mud flap systems, wheel wells and fenders, wheels, tires and various other vehicle components attached to or a part of the underside of a vehicle. The ground vehicle class of particular interest is a tractor-trailer truck system consisting of a motorized lead vehicle pulling one or more non-motorized vehicles. The present invention is designed to control the flow from entering the undercarriage region from the side of a trailer of a tractor-trailer truck system.

There have been several attempts to reduce the aerodynamic drag associated with the undercarriage of the trailer of a tractor-trailer truck system. Trailer undercarriage drag may comprise 25 percent of the total vehicle drag.

The trailer undercarriage is comprised of all the components located below the trailer floor deck surface and the ground or road surface and includes all components attached to the trailer in this region. The flow passing around the tractor-trailer truck vehicle enters the undercarriage region from the trailer side and from the tractor undercarriage region. The undercarriage flow of a trailer is characterized as unsteady and dynamic and comprised of various size and strength eddy currents. The unsteady nature of the undercarriage flow is a result of the flow interacting with the ground or road, rotating wheels, brake systems, axels, tractor undercarriage flow, and the various components comprising the trailer lower surface. Relative to the free stream static pressure, the undercarriage flow imparts an increased pressure on surfaces that face forward and a decreased pressure on surfaces that face aft. The increase in pressure acting on the forward-facing surfaces and the decreased pressure acting on the aft-facing surfaces both generate an aerodynamic drag force. It is estimated that the pressures acting on the trailer wheel assembly accounts for one-half of the undercarriage drag, with the remaining drag being attributed to the flow interacting with numerous small structures comprising the trailer undercarriage. Previous attempts have addressed the undercarriage drag by installing either spanwise or streamwise aerodynamic fairings to the trailer underside to either divert undercarriage flow from the trailer wheel assembly or to block flow from entering the undercarriage region from the trailer side. The flow diverter devices are spanwise fairings that mount to the trailer undercarriage immediately forward of the trailer wheel assembly. The flow diverter fairings are angled downward or outward to divert the undercarriage flow from the wheel assembly. The flow blocking devices are streamwise fairings that mount beneath the trailer outside edge between the trailer wheel assembly and the tractor rear wheel longitudinal position, when the tractor and trailer are joined. Both types of fairings show increased benefit with increased vertical extent of the fairing.

Conventional approaches have used the flow diverter undercarriage fairings to reduce the mass of undercarriage flow that impinges onto the trailer wheel assembly, as shown in U.S. Pat. Nos. 4,386,801, 4,486,046, and 4,640,541. These representative fairing devices, while successful in reducing the mass of flow impinging on the trailer wheel assembly and thereby reducing the wheel assembly drag, do not significantly affect the trailer undercarriage drag. The limited effectiveness of these devices is a result of the drag generated by the device, referred to as device drag. The device drag for these fairings may be equal to the wheel assembly drag. These devices only reduce the wheel assembly drag and do not reduce the remaining undercarriage drag associated with the various trailer components.

Other approaches have used the trailer undercarriage side fairings to reduce the mass and velocity of the flow entering the undercarriage region of a trailer, as shown in U.S. Pat. Nos. 4,611,847, 4,746,160, 5,280,990, 5,921,617, and 6,644,720. These representative flow blocking devices, while successful in reducing the mass of flow entering the trailer undercarriage region are either simple rigid structures or they are complex active, flexible and variable geometry systems. The simple devices are designed to have a limited vertical and longitudinal extent in order to reduce the impact on operations and maintenance. Limiting the vertical and longitudinal extent of the device significantly reduces the flow blocking capability and results in a minimal aerodynamic drag reduction benefit. The complex devices typically have features that are active, flexible, and/or variable in order to maximize the flow blocking capability while minimizing the impact on operations. The complex devices typically consist of multiple components. The complexity of these devices results in increased weight, maintenance, and cost. Each of the trailer undercarriage flow blocking devices consists of a vertically extended structure that attaches to the trailer lower surface outer side edges. These devices are held in position by various support and bracing structures that are integrated into or attached to the inward facing surface of the flow blocking structure. The support and bracing structures add additional forward and rearward facing undercarriage elements that contribute to the undercarriage drag. These support and bracing structures also collect debris, snow and ice during operation resulting in an increase in maintenance and repair requirements.

SUMMARY OF THE INVENTION

The invention relates to an aerodynamic device for reducing drag on a ground vehicle. The device includes a first pair of rigid panels attached to the left side of the bottom surface of the vehicle and extending downward from the vehicle, including an outer panel substantially coplanar with the left surface of the vehicle and an inner panel located inboard of the outer panel; and a second pair of rigid panels attached to the right side of the bottom surface of the vehicle and extending downward from the vehicle, including an outer panel substantially coplanar with the right surface of the vehicle and an inner panel located inboard of the outer panel. The panels on the left or right side of the vehicle may be comprised of a single panel or of multiple longitudinal segments. Each panel typically extends downward from the vehicle a distance of less than about 90% of the distance from the bottom surface of the vehicle to the surface that the vehicle is moving over. Each panel in the pairs may extend downward a substantially equal distance from the bottom surface of the vehicle, the shape and distance of the downward extension may vary along the length of the panel.

In one embodiment, the pair of panels is integrally connected to each other by a horizontal panel. The pair of panels may also be connected by a horizontal panel that is separate from the pair. The panels may also be an integral extension of the side surface of the vehicle. The panels may have various profiles, such as a swept leading or trailing edge. In one embodiment, the panels are connected to the vehicle such that the panels may be folded so as to be substantially adjacent and proximate the bottom surface of the vehicle when not in use. The pairs of panels may also be slidably connected to the vehicle such that the panels slide longitudinally along the vehicle. The distance between at least one of the first or second pairs of panels may be adjustable. The pairs of panels may further include one or more additional panels located inboard from the existing panel pair. For example, a third or more panels may be included in each panel grouping.

One aspect of the invention is to prohibit flow from entering the trailer undercarriage region and interacting with the complex geometry comprising the trailer undercarriage and wheel assembly by creating two similar structures that attach to the trailer underside near the two outside edges of the trailer. The two similar structures comprising the present invention are light-weight aerodynamic fairings that attach to the undercarriage of a dry van, refer, flat deck, or tanker trailer near the two outside edges of the trailer. The two similar structures are of minimum vertical extent and include two vertically aligned surfaces and one horizontal surface that attach to the underside of the trailer near the trailer outside edge. The outer edge of each structure is positioned parallel to and below each outer side edge of the trailer. Each structure extends as close as practical to the ground based upon operational and maintenance criteria. Each structure is located longitudinally between the trailer wheel assembly and the tractor aft wheel set. Each structure is variable in length and is capable of covering a variable longitudinal distance between the trailer wheel assembly and the tractor rear wheels.

The flow blocking performance of each of the two structures is enhanced through the effective use of three flow control concepts: vortex generation, upwash management, and ground effect interference. Each of the two structures accomplishes the flow control and drag reduction goals with two vertically orientated surfaces and one horizontal surface. The two vertically orientated surfaces are an outer vertical surface located at the outside edge of the trailer and an inner vertical surface located inboard of the first surface. The horizontal surface extends between the two upper edges of the two vertical surfaces to create an inverted "U" shaped channel. The two vertical surfaces of each structure are of equivalent longitudinal and vertical length and the lower edge of both surfaces is aerodynamically sharp.

Each of the two structures may be comprised of multiple longitudinal segments. At a minimum each structure is comprised of a single segment. In a preferred embodiment, the structure has a forward longitudinal segment, center longitudinal segment and an aft longitudinal segment. The center longitudinal segment may be further divided into multiple center longitudinal segments to address installation, maintenance, and operational concerns. A single longitudinal segment is comprised of a single outer vertical surface element, a single inner vertical surface element, and a single horizontal surface element. The forward longitudinal segment of each structure has a forward edge that is shaped to meet the operational, maintenance, and performance needs of the user and is aerodynamically sharp. Each center longitudinal segment of the structure has a forward edge that is shaped to join the rear edge of the segment immediately forward of the segment and a rear edge that is shaped to join the forward edge of the segment immediately aft of the segment. The rear longitudinal segment of each structure has a rear edge that is shaped to meet the operational, maintenance, and performance needs of the user and is aerodynamically sharp. The rear longitudinal segment fairing may longitudinally extend forward and rearward to adjustably locate its rearward edge in a selected position forward of the trailer's wheel assembly. The longitudinal adjustment of the rear segment is by means of a slide engagement with the center longitudinal segment located adjacent and forward of the rear longitudinal segment.

The outer vertical surface of the structure is designed to both block flow from entering the undercarriage region and to turn the flow passing under the outer vertical surface upward thereby creating an upwash field between the two vertical surfaces. The upwash field is generated by means of a coherent vortex structure emanating from the aerodynamically sharp lower edge of the outer surface. The inner vertical surface blocks the upwash field from flowing inboard and interacting with the trailer undercarriage and wheel assembly. The horizontal surface blocks the upwash flow from interacting with the trailer undercarriage in the region between the two vertical surfaces. The result of the flow control techniques allows the present invention to block a significantly greater mass of flow from entering the undercarriage region compared to a fairing with a single vertical surface of equal vertical extent. The addition of a horizontal surface between the two vertical surfaces ensures that the blocked upwash flow does not generate a drag force. The invention also takes advantage of the increased turbulence in the flow adjacent to the road surface at the side edge of the trailer to further promote upwash thereby increasing the effective blocking area of the structure. Although upwash is present for all existing trailer undercarriage flow blocking fairings the present invention is the only device that captures the upwash field and thereby controls a greater mass of air from entering the undercarriage region by means of the inner vertical surface and ensues that the blocked and captured flow does not generate a drag by means of the horizontal surface. The ability of the present invention to block a greater mass of flow with less vertical extent from the trailer undercarriage, compared to existing single surface fairings, allows the present invention to provide a larger vertical gap between the ground or road surface and the invention lower edge, thereby eliminating the need for vertically movable, deflectable, and actuated surfaces to adapt to various surface and/or road structures that may impact the lower edge of the fairing; results in a reduced aerodynamic load on the vertical surfaces that eliminates the need for structural bracing and supports thereby reducing or eliminating device drag; have all components comprising the invention to be smooth and aligned parallel with the vehicle axis thereby elimination device pressure drag.

BRIEF DESCRIPTION OF THE DRAWINGS

The invention will be better understood in relation to the attached drawings illustrating preferred embodiments, wherein.

DETAILED DESCRIPTION OF THE PREFERRED EMBODIMENTS

The following descriptions are of exemplary embodiments of the invention only, and are not intended to limit the scope, applicability or configuration of the invention in any way. Rather the following description is intended to provide a convenient illustration for implementing various embodiments of the invention. As will become apparent, various changes may be made in the function and arrangement of the elements described herein without departing from the spirit and scope of the invention. For example, though not specifically described, many shapes, widths, leading edge shapes, spacing and orientation of the forward extended plurality of panels, candidate vehicles that can benefit from the device, fabrication means and material, attachments means and material should be understood to fall within the scope of the present invention.

Referring now in detail to the drawings, like numerals herein designate like numbered parts in the figures.

Figure 1A:
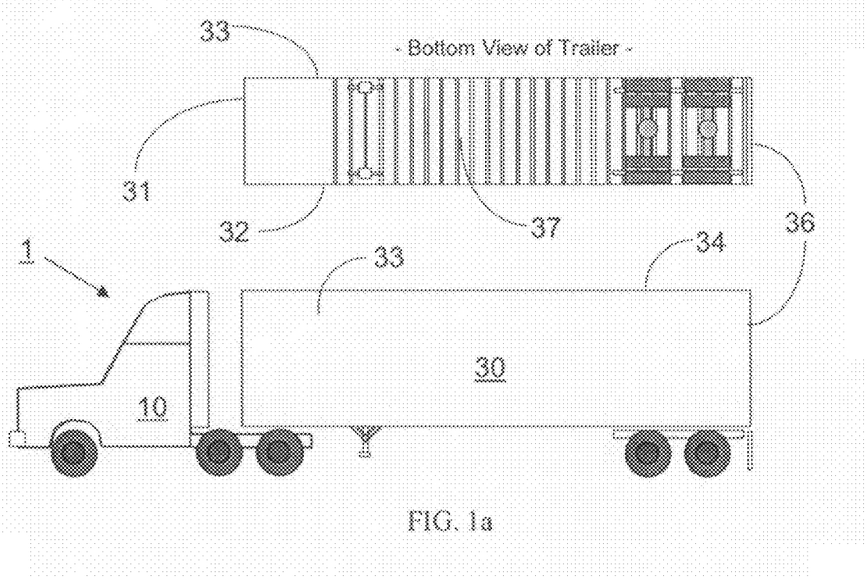
FIG. 1A is a side and lower surface view of a tractor-trailer truck system.
Figure 1B:
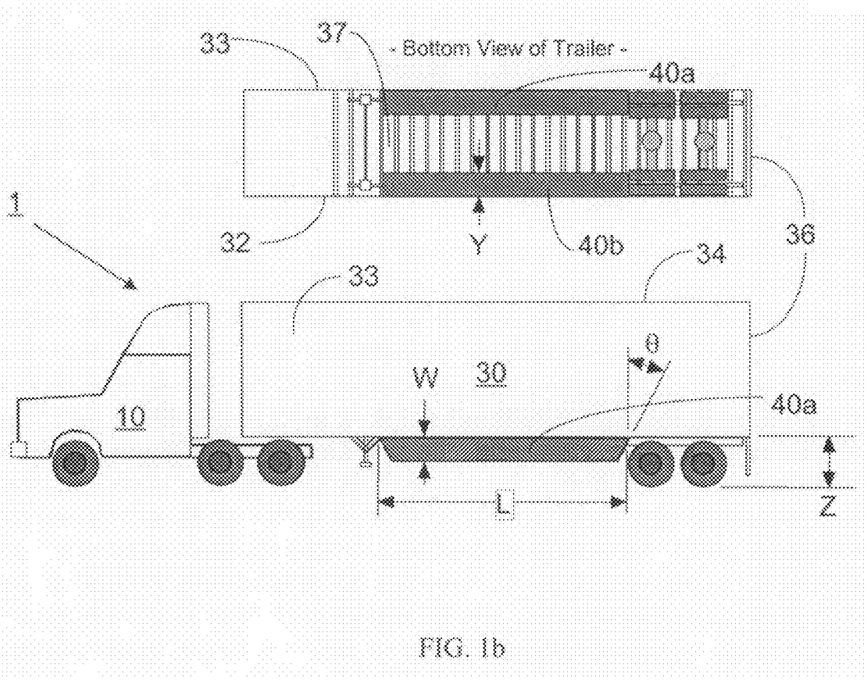
FIG. 1B is a side and lower surface view of a tractor-trailer truck system with the present invention installed on the lower surface of the trailer.

FIG. 1 shows a typical tractor-trailer truck system 1, for example, comprised of a powered tractor 10 that pulls a trailer 30. The trailer 30 is comprised of a front surface 31, side surfaces 32 and 33, a top surface 34, a rear surface 36, and a lower surface 37. FIG. 1 shows a side and lower surface view of a typical trailer 30 of a tractor-trailer truck with and without the present invention installed on the lower surface 37 of a trailer 30. The device 40 is comprised of two structures 40a and 40b that extended downward from the vehicle lower surface 37. The downward extent of each panel is typically anywhere less than about 90% of the distance from the trailer lower surface to the surface or road that the vehicle is moving over. Each of the two structures, 40a and 40b, are positioned with the outer vertical surface, aligned approximately with the plane of the trailer side surface 32 or 33. Of course, the present invention may be used with flat bed trailers or vehicles as well, in which the plane of side surfaces 32 or 33 may be somewhat notional. The inner vertical surface of each structure 40a, 40b is positioned inboard of the outer vertical surface. Each structure has a width W and a length L. The leading edge and trailing edge of each structure is swept an angle θ. To facilitate access to the vehicle undercarriage, each panel of the device 40 may be either removed through a quick disconnect mechanism or folded out of the way, so as to be substantially adjacent and proximate the lower surface 30. The length L of each structure, 40a and 40b, of the device 40 is determined by the geometric characteristics of the vehicle 30, the operational requirements of the vehicle 30, and the maintenance requirements of the vehicle 30. It is desirable that each structure, 40a and 40b, of the device 40 extend between a point forward of the trailer rear wheel assembly to a point aft of the tractor rear wheel set. The width W of each structure, 40a and 40b, of the device 40 is determined by the geometric characteristics of the vehicle 30, the operational requirements of the vehicle 30, and the maintenance requirements of the vehicle 30. The type, size, and structure of the hardware used to attach the invention to the trailer undercarriage is determined by the geometric characteristics of the vehicle 30, the operational requirements of the vehicle 30, and the maintenance requirements of the vehicle 30.

Figure 2A:
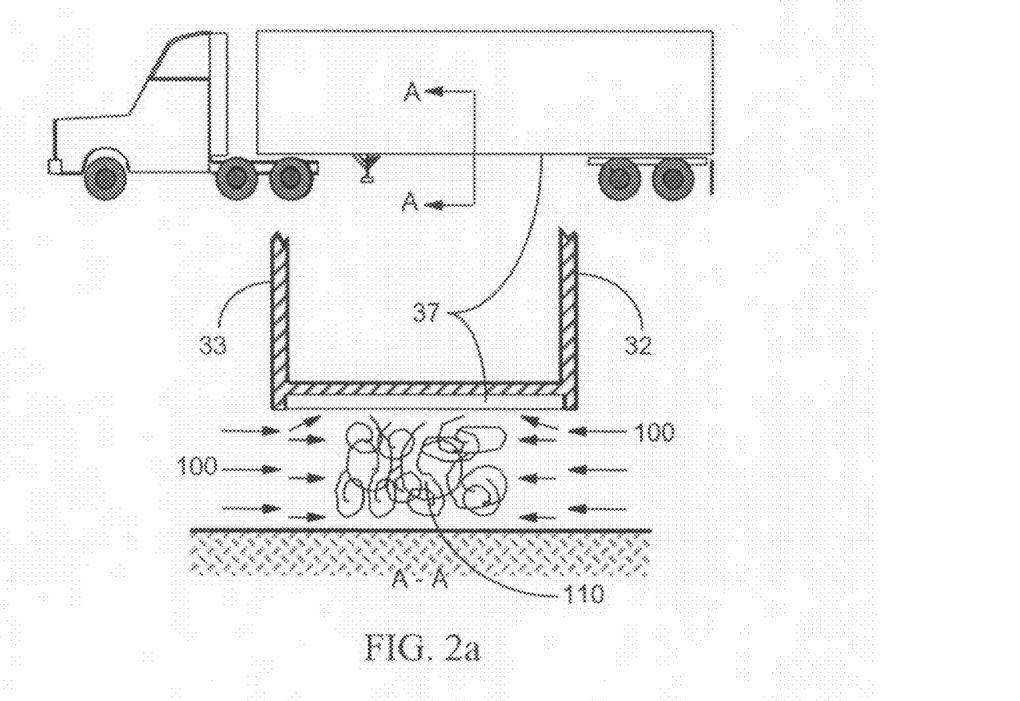
FIGS. 2A-B are cross section views, in a plane perpendicular to the ground, of the undercarriage flow conditions for a tractor-trailer system with and without the present invention installed.
Figure 2B:
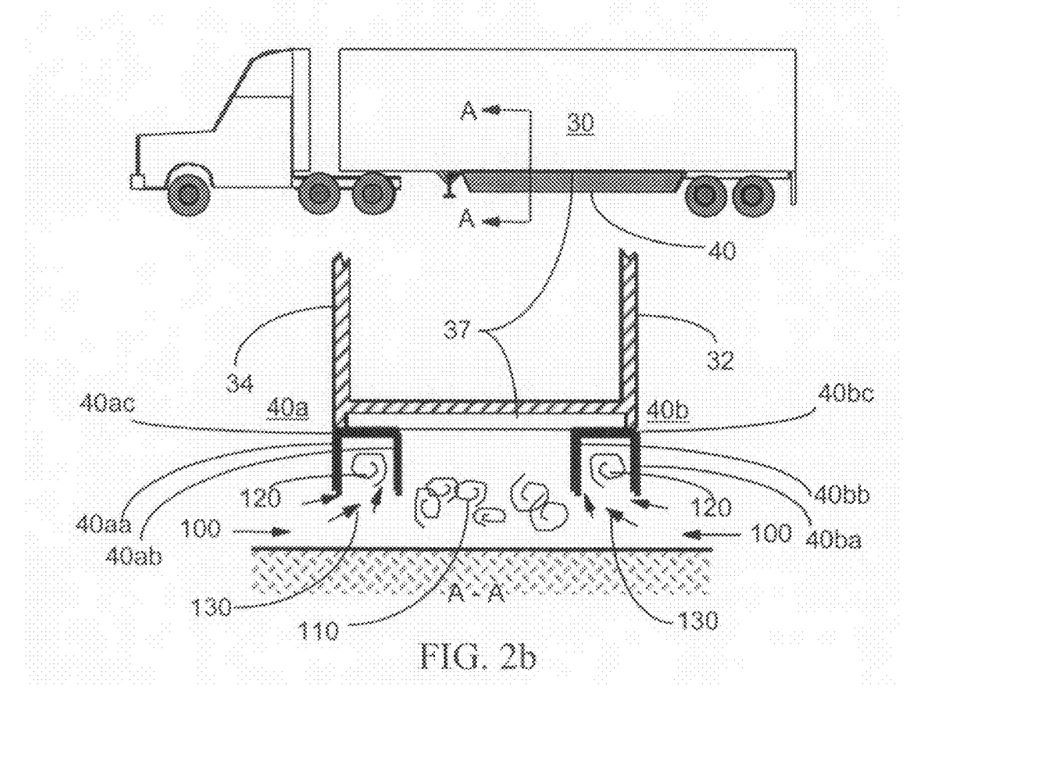

FIGS. 2A and 2B show flow patterns in the undercarriage region of trailer 30 of a tractor-trailer truck with and without the present invention installed. In FIG. 2A and FIG. 2B, the airflow about the vehicle and in the undercarriage region is represented by arrow-tipped lines 100 and 130 and swirl structures 110 and 120. The arrow-tipped lines 100 represent the free stream flow entering the undercarriage region. The arrow-tipped lines 130 represent the upwash flow entering the region bound by the outer vertical surface and inner vertical surface of the device 40. The swirl structures 110 represent rotational, random, unsteady eddy flow. The swirl structures 120 represent coherent vortex flow structures.

FIG. 2A shows a cross-section view, in a plane perpendicular to the ground, of the undercarriage of a trailer 30 with side surface 32 and 33 and a floor surface 37. FIG. 2A also shows the undercarriage flow 100 and 110, without the present invention installed. For a trailer moving over a surface or road, the free stream flow 100 turns inboard and enters the undercarriage region of the trailer 30. The freestream flow interacts with the various vehicle components and becomes unstructured and dynamic and includes random size and strength eddies 110. The dynamic, random undercarriage flow interacts with the vehicle undercarriage structures resulting in a large drag force.

FIG. 2B shows a cross-section view, in a plane perpendicular to the ground, of the undercarriage of a trailer 30 with side surface 32 and 33 and a floor surface 37 and the two structures 40a and 40b comprising the subject invention 40. Each structure, 40a and 40b, comprising the device 40 contains three primary surfaces; an outer vertical surface, 40aa and 40ba, an inner vertical surface, 40ab and 40bb, and a horizontal surface, 40ac and 40bc, where the horizontal surface extends between the upper most edge of the outer vertical surface and inner vertical surface comprising each structure 40a and 40b. FIG. 2B also shows the undercarriage flow 100, 110 and 120, with the subject invention 40 installed. For a trailer moving over a surface or road, the free stream flow 100 is directed aft along the outward facing surface of the outer vertical surfaces, 40aa and 40ba, of the device 40. A portion of the free stream flow 100 located near the ground or road surface turns inboard and impinges on the lower edge of the outer vertical surface, 40aa and 40ba, of the device 40 and results in a coherent vortex structure 120 that is located between the outer vertical surface, 40aa and 40ba, and inner vertical surface, 40ab and 40bb. The creation of the vortex structure 120 results in the generation of an upwash field 130 that redirects a significant portion of the inward-flowing free stream flow 100 upward and into the channel created by the outer vertical surfaces 40aa and 40ba and the inner vertical surfaces 40ab and 40bb. The upwash effect reduces the mass of free stream flow entering the undercarriage region and interacting with the undercarriage structure trailer 30 undercarriage region. Reducing the mass of the dynamic, random undercarriage flow that interacts with the vehicle undercarriage structures results in a reduced drag force.

Figure 3A:
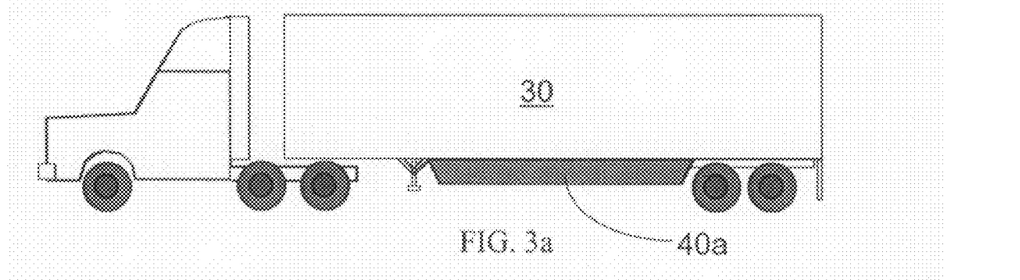
FIGS. 3A-3D are side views of a tractor-trailer truck with alternate embodiments of the invention installed.
Figure 3B:
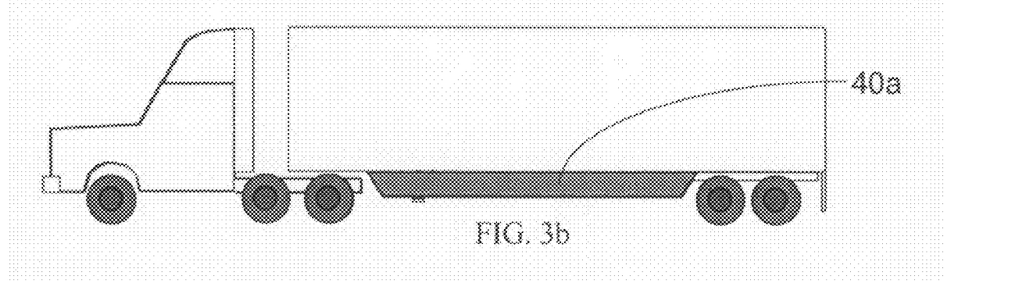
Figure 3C:
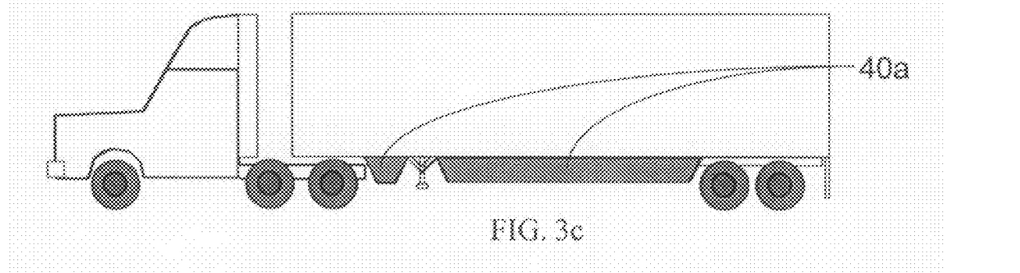
Figure 3D:
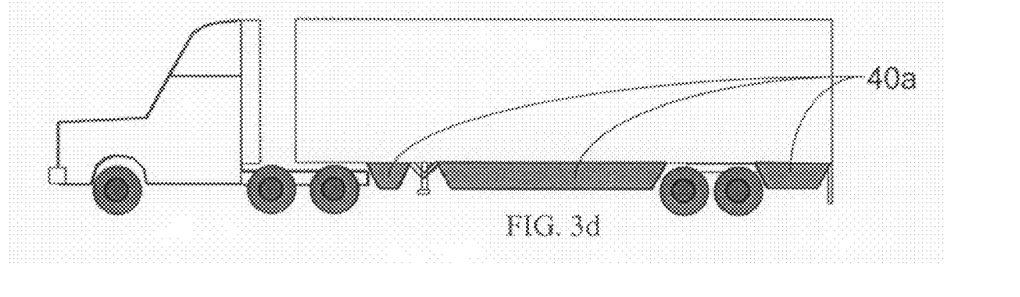

FIGS. 3A-3D are side and top views of a tractor trailer ground vehicles 1 with the subject invention installed on the trailer 30 lower surface 37. FIG. 3A shows a single segment version of the device 40 including structures 40a and 40b with swept leading and trailing edges installed between the trailer landing gear and the trailer wheel assembly. FIG. 3B shows a single segment version of the device 40 including structures 40a and 40b with swept leading and trailing edges installed between the tractor rear wheels and the trailer wheel assembly. FIG. 3C shows a two segment version of the device 40 including structures 40a and 40b with swept leading and trailing edges installed between the tractor rear wheels and the trailer wheel assembly. FIG. 3D shows a three segment version of the device 40 including structures 40a and 40b with swept leading and trailing edges installed between the tractor rear wheels and the rear of the trailer.

Figure 4A:
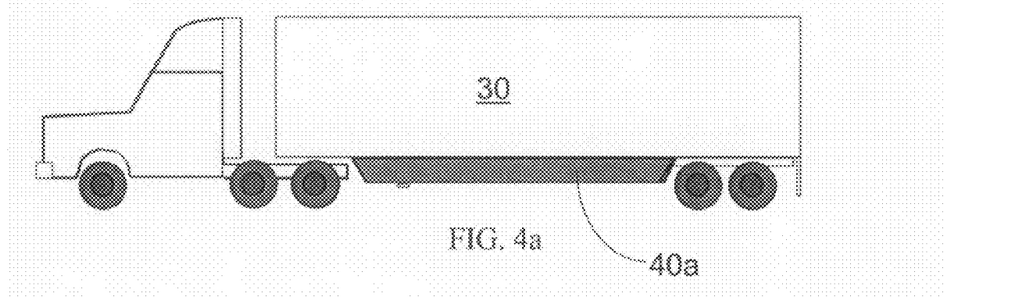
FIGS. 4A-4C are side views of a tractor-trailer truck with alternate embodiments of the invention installed.
Figure 4B:
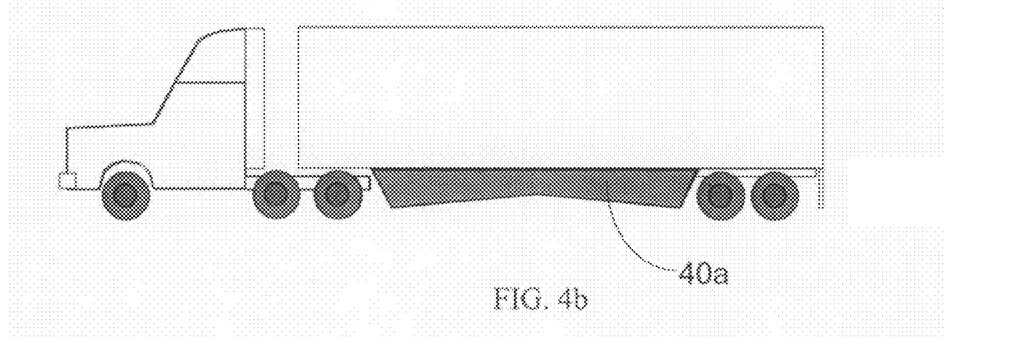
Figure 4C:
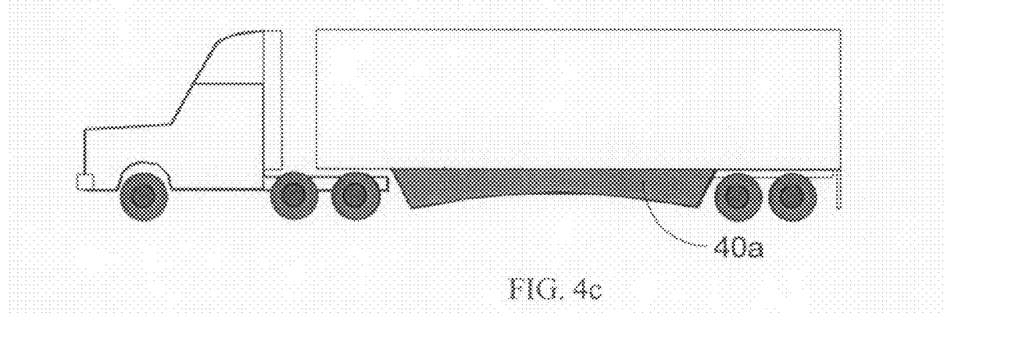

FIGS. 4A-4C are side and top views of a tractor trailer ground vehicles 1 with the subject invention installed on the trailer 30 lower surface 37. FIG. 4A shows a single segment version of the device 40 including structures 40a and 40b with swept leading and trailing edges installed between the tractor rear wheels and the trailer wheel assembly. FIG. 4B shows a single segment version of the subject invention 40 including structures 40a and 40b with swept leading and trailing edges installed between the tractor rear wheels and the trailer wheel assembly and that has a varying vertical extent that varies linearly from a maximum at the forward most position to a minimum at the mid point and to a maximum at the rear most position. FIG. 4C shows a single segment version of the device 40 including structures 40a and 40b with swept leading and trailing edges installed between the tractor rear wheels and the trailer wheel assembly and that has a varying vertical extent that varies nonlinearly from a maximum at the forward most position to a minimum at the mid point and to a maximum at the rear most position.

Figure 5A:
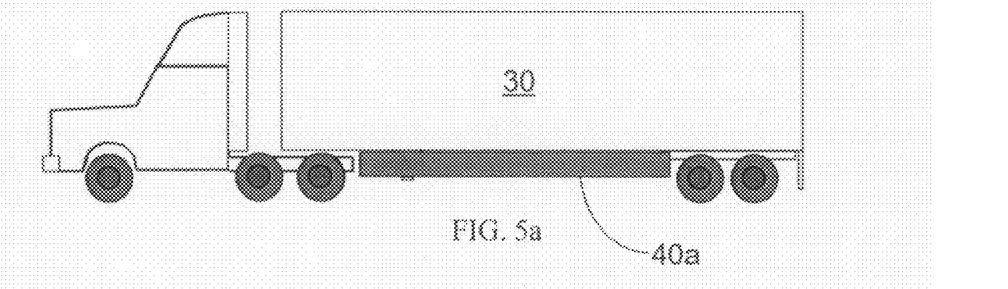
FIGS. 5A-5D are side views of a tractor-trailer truck with alternate embodiments of the invention installed.
Figure 5B:
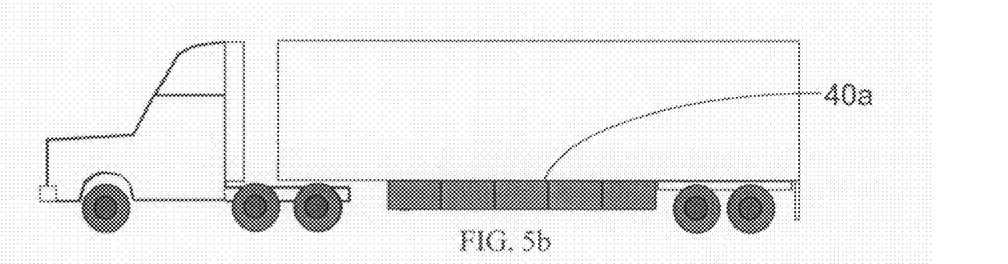
Figure 5C:
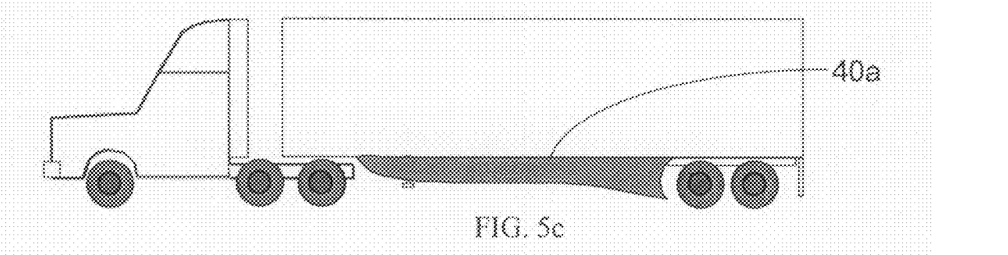
Figure 5D:
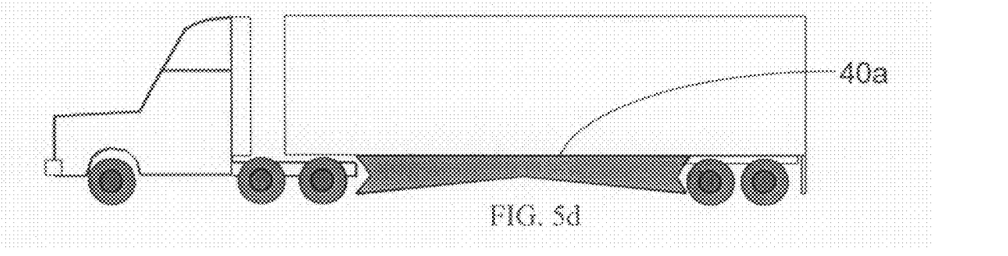

FIG. 5A-5D are side and top views of a tractor trailer ground vehicles 1 with the present invention installed on the trailer 30 lower surface 37. FIG. 5A shows a single segment version of the device 40 including structures 40a and 40b with unswept leading and trailing edges installed between the tractor rear wheels and the trailer wheel assembly. FIG. 5B shows a multiple-segment version of the device 40 including structures 40a and 40b with unswept leading and trailing edges installed between the tractor rear wheels and the trailer wheel assembly. FIG. 5C shows a single segment version of the device 40 including structures 40a and 40b with complex curved leading edges, bottom edges and trailing edges installed between the tractor rear wheels and the trailer wheel assembly. FIG. 5D shows a single segment version of the device 40 including structures 40a and 40b with notched leading edges and trailing edges installed between the tractor rear wheels and the trailer wheel assembly and that has a varying vertical extent that varies linearly from a maximum at the forward most position to a minimum at the mid point and to a maximum at the rear most position.

Figure 6A:
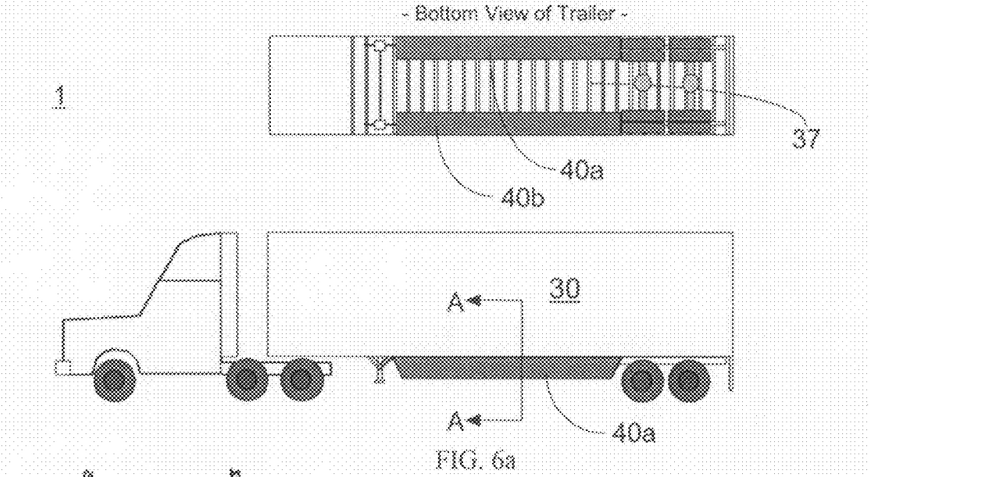
FIGS. 6A-6B is a side view and cross-section views of the present invention illustrating various installation and fabrication concepts.

FIG. 6A are side and top views of a tractor trailer ground vehicles 1 with the device 40 installed on the trailer 30 lower surface 37. FIG. 6A shows a single segment version of the device 40 including structures 40a and 40b with swept leading and trailing edges installed between the trailer landing gear and the trailer wheel assembly.

Figure 6B:
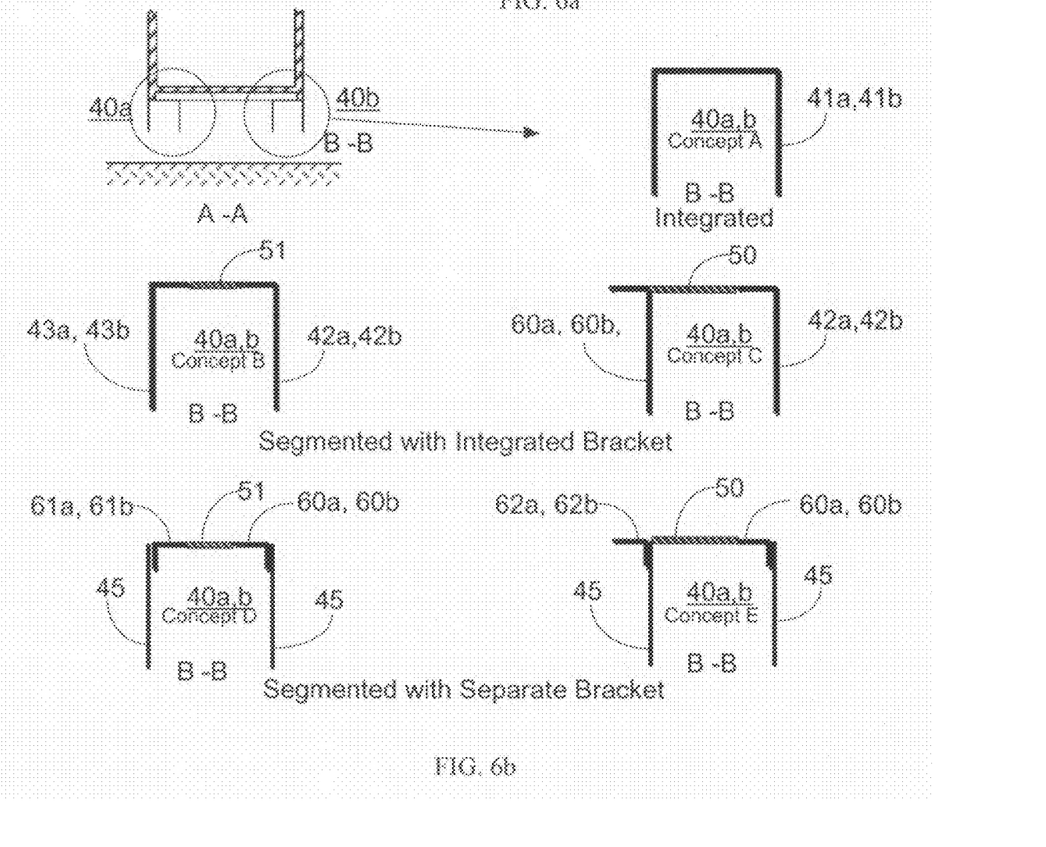

FIG. 6B shows a cross-section view A-A, in a plane perpendicular to the ground, of the undercarriage of a trailer 30 with the two structures 40a and 40b comprising the device 40. FIG. 6B shows a cross-section view B-B with details of various embodiments of the device 40 comprised of structures 40a and 40b. Concept A shows each structure 40a and 40b of the device 40 may be constructed as an integrated unit 41a and 41b, respectively. Concepts B and C show each structure 40a and 40b of the device 40 may be constructed as individual components with an integrated attachment bracket 42a, 43a, 44a and 42b, 43b, 44b, respectively and a separate horizontal surface 50 and 51. Concepts D and E show each structure 40a and 40b of the device 40 maybe constructed as individual components 45a and 45b with attachment brackets 60a, 61a, 62a and 60b, 61b, 62b, respectively and a separate horizontal surface 50 and 51.

Figure 7A:
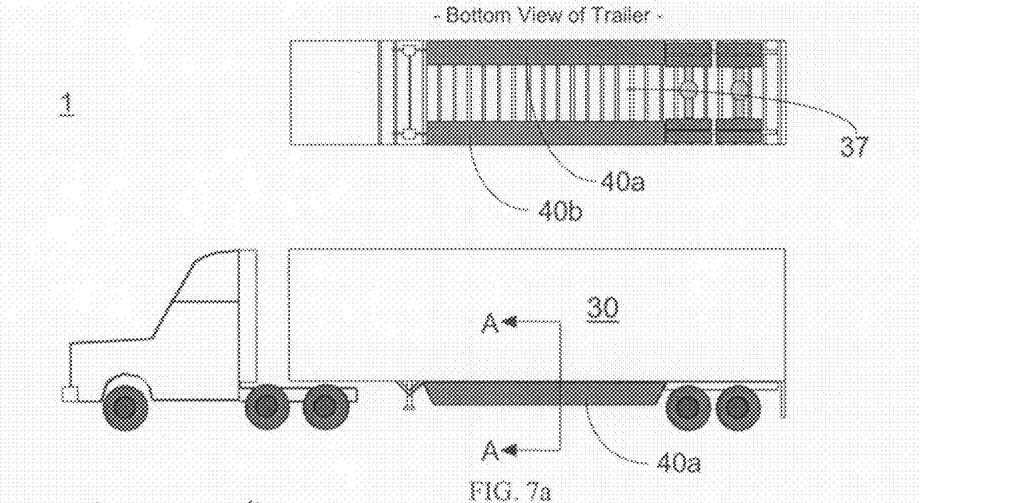
FIGS. 7A-7B is a side view and cross-section views of the present invention illustrating various edge treatments and fabrication concepts.

FIG. 7A are side and top views of a tractor trailer ground vehicles 1 with the device 40 installed on the trailer 30 lower surface 37. FIG. 7A shows a single segment version of the device 40 including structures 40a and 40b with swept leading and trailing edges installed between the trailer landing gear and the trailer wheel assembly.

Figure 7B:
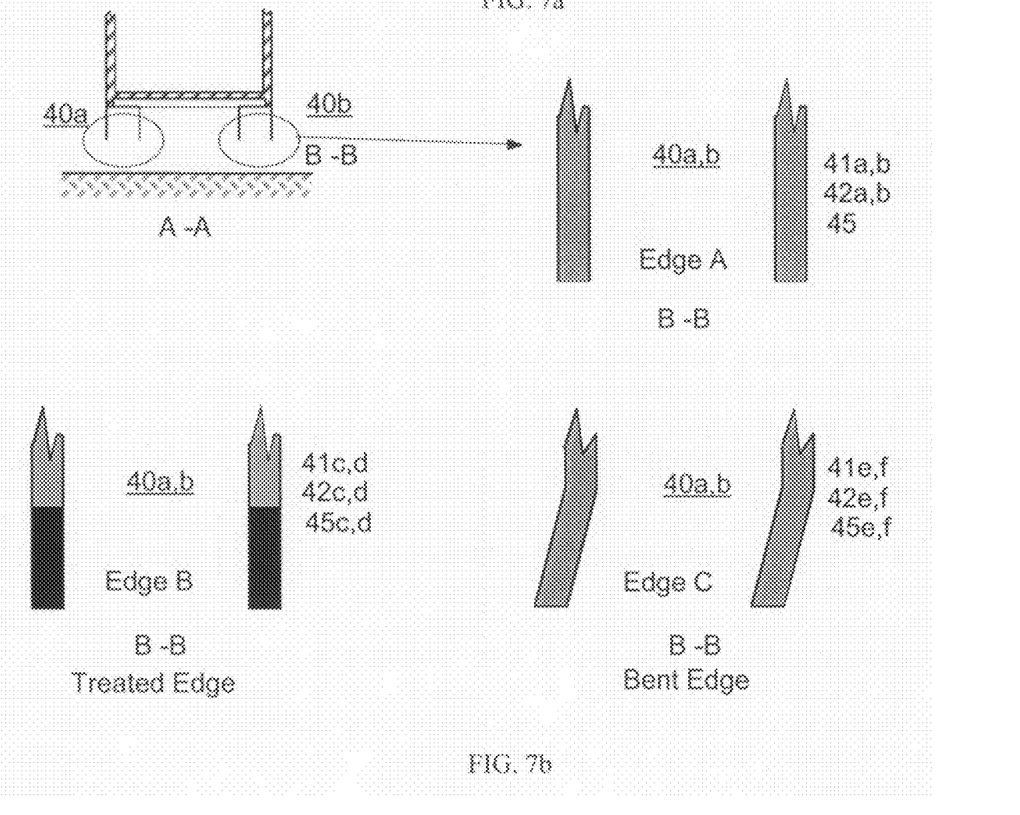

FIG. 7B shows a cross-section view A-A, in a plane perpendicular to the ground, of the undercarriage of a trailer 30 with the two structures 40a and 40b comprising the device 40. FIG. 7B cross-section view B-B show details of various embodiments of the device 40 including structures 40a and 40b. Edge concept A shows that the lower edge of the outer vertical surface and inner vertical surface of each structure 40a and 40b of the device 40 may be constructed as an integrated unit of the outer and inner vertical surfaces. Edge concept B shows that the lower edge of the outer vertical surface and inner vertical surface of each structure 40a and 40b of the device 40 maybe constructed as dissimilar material from that composing the outer and inner vertical surfaces. Edge concept C shows that the lower edge of the outer vertical surface and inner vertical surface of each structure 40a and 40b of the device 40 may be deflected out of the plane of the outer and inner vertical surfaces.

Figure 8A:
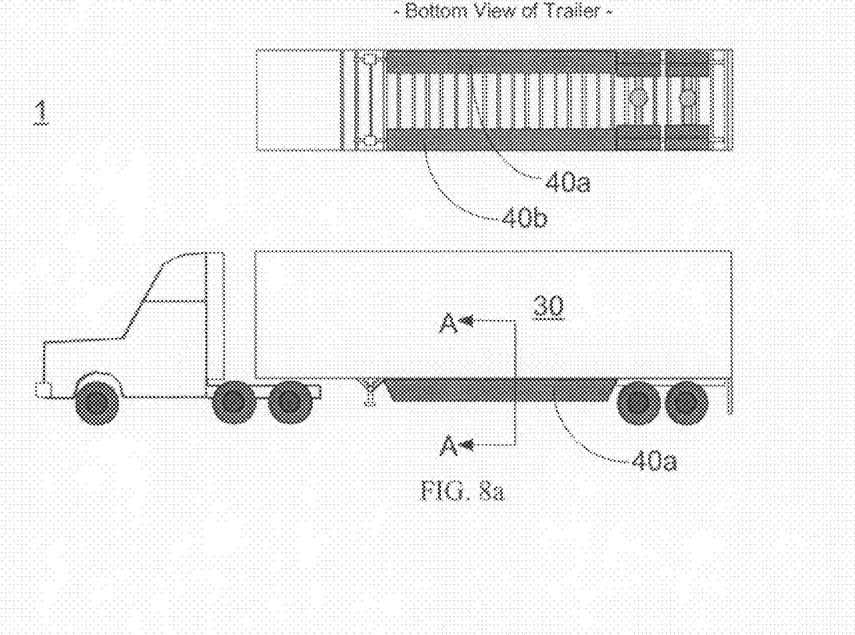
FIGS. 8A-8B is a side view, perspective view, and cross-section view of the invention illustrating the preferred stiffening and mounting concept.

FIG. 8A are side and top views of a tractor trailer ground vehicles 1 with the device 40 installed on the trailer 30 lower surface 37. FIG. 7A shows a single segment version of the device 40 including structures 40a and 40b with swept leading and trailing edges installed between the trailer landing gear and the trailer wheel assembly.

Figure 8B:
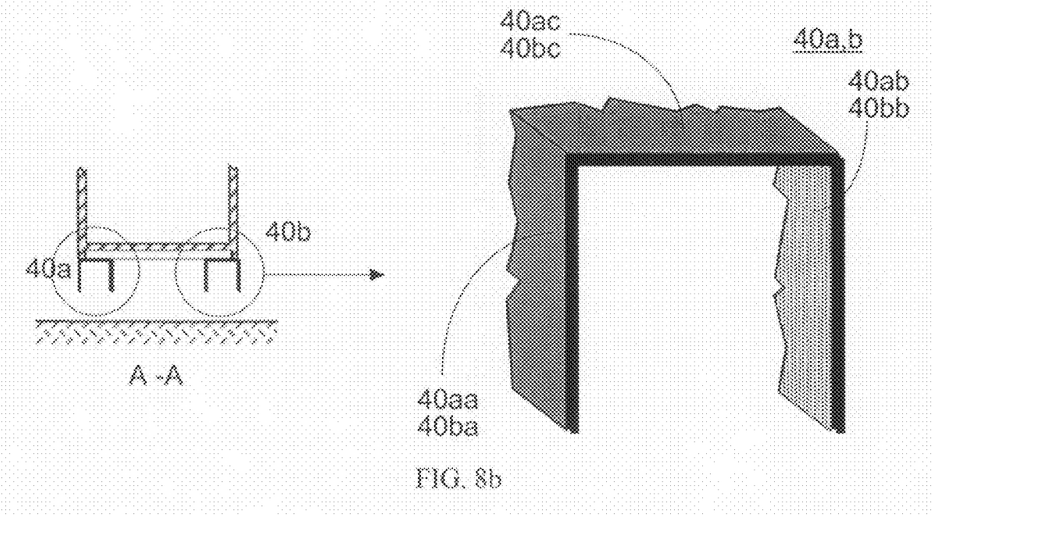

FIG. 8B shows a cross-section view, in a plane perpendicular to the ground, of the undercarriage of a trailer 30 and the two structures 40a and 40b comprising the device 40. The preferred embodiment of the invention is that the device 40 is self-supporting without bracing and bracket. For the preferred embodiment each structure, 40a and 40b, comprising the device 40 contains three primary surfaces; an outer vertical surface, 40aa and 40ba, an inner vertical surface, 40ab and 40bb, and a horizontal surface, 40ac and 40bc, where the horizontal surface extends between the upper most edge of the outer vertical surface and inner vertical surface comprising each structure 40a and 40b. The structures 40a and 40b mechanically attach to the trailer undercarriage by any suitable attachment device, such as clamps, bolts, weld, interlocking pieces, and the like.

Figure 9A:
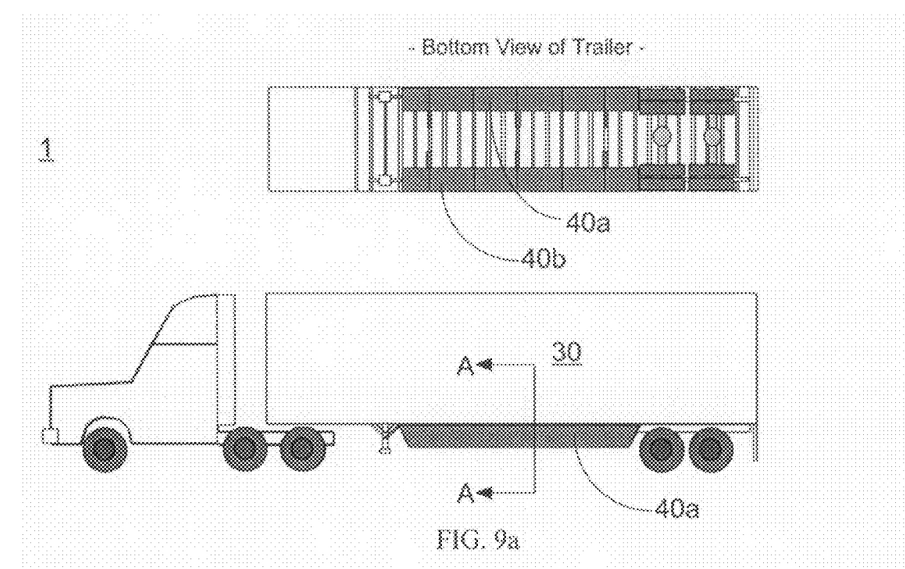
FIGS. 9A-9B is a side view, perspective view, and cross-section view of the invention illustrating an alternate stiffening and mounting concept.

FIG. 9A shows side and top views of a tractor trailer ground vehicles 1 with the device 40 installed on the trailer 30 lower surface 37. FIG. 9A shows a single segment version of the device 40 including structures 40a and 40b with swept leading and trailing edges installed between the trailer landing gear and the trailer wheel assembly.

Figure 9B:
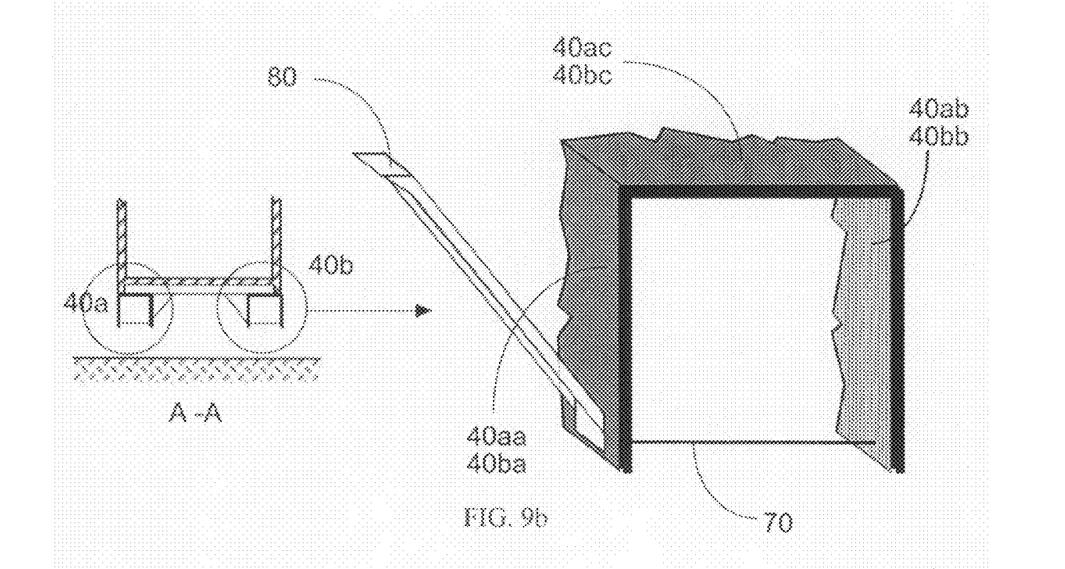

FIG. 9B shows a cross-section view, in a plane perpendicular to the ground, of the undercarriage of a trailer 30 and the two structures 40a and 40b comprising the device 40. An alternate embodiment of the invention is that the device 40 employs a minimal sized bracing to provide the necessary rigidity. For this embodiment, each structure, 40a and 40b, comprising the device 40 contains three primary surfaces; an outer vertical surface, 40aa and 40ba, an inner vertical surface, 40ab and 40bb, and a horizontal surface, 40ac and 40bc, where the horizontal surface extends between the upper most edge of the outer vertical surface and inner vertical surface comprising each structure 40a and 40b. Bracing may be applied in the form of an angle bracket 80 that attaches to the inward facing surface of the inner vertical surface 40ab and 40bb and to the trailer undercarriage. Support may be supplied to the outer vertical surface by means of a minimum-diameter support rod or member 70. The structures 40a and 40b mechanically attach to the trailer undercarriage by any suitable attachment device, such as clamps, bolts, weld, interlocking pieces, and the like.

Figure 10A:
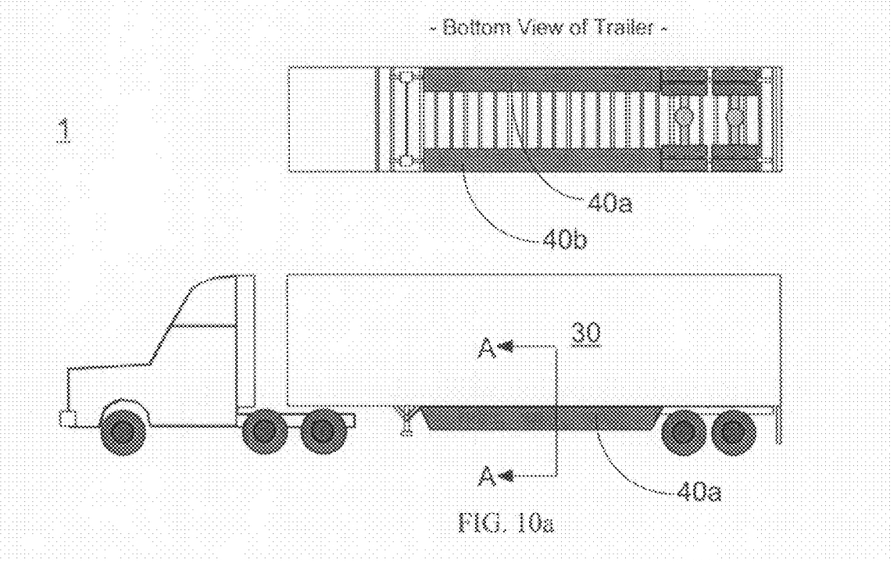
FIGS. 10A-10B is a side view, perspective view, and cross-section view of the invention illustrating an alternate stiffening and mounting concept.

FIG. 10A shows side and top views of a tractor trailer ground vehicles 1 with the device 40 installed on the trailer 30 lower surface 37. FIG. 7A shows a single segment version of the device 40 including structures 40a and 40b with swept leading and trailing edges installed between the trailer landing gear and the trailer wheel assembly.

Figure 10B:
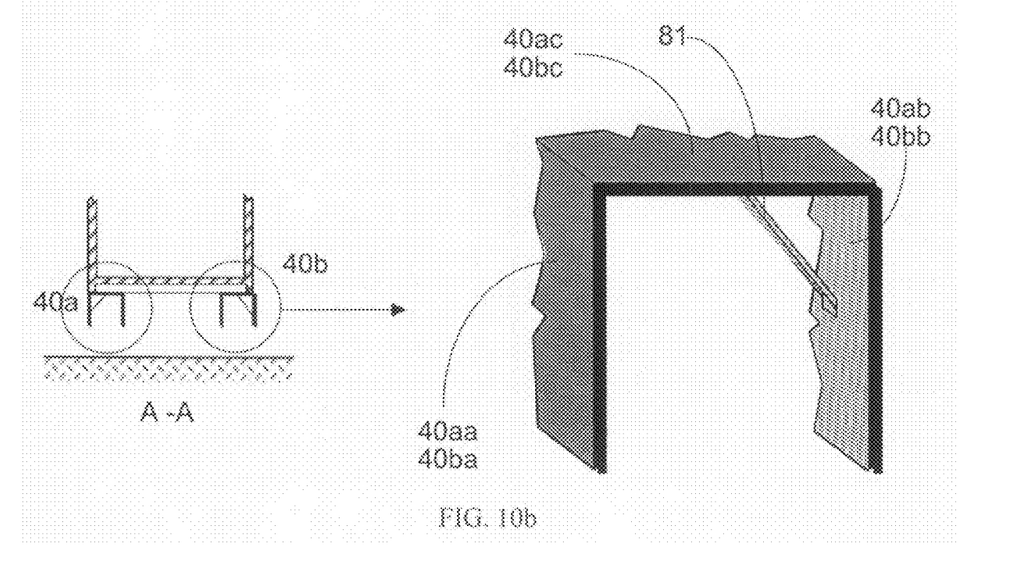

FIG. 10B shows a cross-section view, in a plane perpendicular to the ground, of the undercarriage of a trailer 30 and the two structures 40a and 40b comprising the device 40. A further alternate embodiment of the invention is that the device 40 employs a minimal sized bracing to provide the necessary rigidity to the outer vertical surface 40aa and 40ba. For this embodiment, each structure, 40a and 40b, comprising the device 40 contains three primary surfaces; an outer vertical surface, 40aa and 40ba, an inner vertical surface, 40ab and 40bb, and a horizontal surface, 40ac and 40bc, where the horizontal surface extends between the uppermost edge of the outer vertical surface and inner vertical surface comprising each structure 40a and 40b. Bracing may be applied in the form of minimum-sized angle bracket 81 that attaches to the inward facing surface of the outer vertical surface 40aa and 40ba and to the horizontal surface. The structures 40a and 40b mechanically attach to the trailer undercarriage by any suitable attachment device, such as clamps, bolts, weld, interlocking pieces, and the like.

While the invention has been described and illustrated using two pairs or panels on the bottom surface of the vehicle, those of skill in the art will understand that the invention is not so limited. For example, a third or more panels may be included in each panel grouping on the bottom surface of the vehicle. It is believed that such additional panels would further enhance the aerodynamic drag reduction of the device.

From the description provided above, a number of features of the mini-skirt aerodynamic fairing become evident:

The invention provides a process to reduce the drag of a ground vehicle.

(a) The invention uses vortices to generate upwash to reduce undercarriage flow and reduce drag.
(b) The invention reduces the aerodynamic drag and improves the operational efficiency of bluff-base vehicles.
(c) The invention reduces the aerodynamic drag and improves the fuel efficiency of bluff-base vehicles.
(d) The invention conserves energy and improves the operational efficiency of bluff-base vehicles.
(e) The invention reduces the aerodynamic drag without a significant geometric modification to existing ground vehicles.
(f) The invention may be easily applied to any existing ground vehicle or designed into any new ground vehicle.
(g) The invention may be efficiently operated with a limited number of components.
(h) The invention permits the matching of complex surface shapes by the shaping and placement of the components.
(i) Large reductions in drag force may be achieved with a large vertical spacing between the lower edge of the invention and the road surface.
(j) The structure, placement, and shape of each component may be adapted to meet specific performance or vehicle integration requirements.
(k) The leading edge shape of each surface may be linear or complex to meet specific performance or vehicle integration requirements.
(l) The lower edge shape of each surface may be linear or complex to meet specific performance or vehicle integration requirements.
(m) The trailing edge shape of each surface may be linear or complex to meet specific performance or vehicle integration requirements.
(n) Each component of the device may be optimally positioned on the vehicle undercarriage.
(o) The device minimizes weight and volume requirements within the vehicle.
(p) The device has minimal maintenance requirements.
(q) The device has minimal impact on operational and use characteristics of the vehicle door system.
(r) The device provides for maximum safety of vehicle operation.

Accordingly, the reader will see that the mini-skirt aerodynamic fairing device can be used to easily and conveniently reduce aerodynamic drag on any ground vehicle for the purposes of improving the operational performance of the vehicle. For example, ground vehicles may include busses, rail cars, automobiles, etc., so long as such vehicle would benefit from the present invention's implementation of the three flow control concepts of vortex generation, upwash management, and ground effect interference.

Although the description above contains many specificities, these should not be construed as limiting the scope of the invention but as merely providing illustrations of some of the presently preferred embodiments of this invention. For example, the outer and inner vertical surfaces can be composed of various planar shapes such as ellipsoid, quadratic, and the like; the outer and inner vertical surfaces can be rotated from the vertical axis or may be curvilinear surfaces that are parallel with the axis of the vehicle; the thickness and width can vary along the length; the material can be any light-weight and structurally sound material such as wood, plastic, metal, composites, and the like; the substrate can be any metal, wood, plastic, composite, rubber, ceramic, and the like; the application surface can be that of a metal, wood, plastic, composite, rubber, ceramic, and the like. The attachment and actuation hardware can be either conventional off the shelf or designed specifically for the subject invention. Further, the present invention may be incorporated or integrated within the structure of the vehicle, so as to require no separate attachment.

The invention has been described relative to specific embodiments thereof and relative to specific vehicles, it is not so limited. The invention is considered applicable to any road vehicle including race cars automobiles, trucks, buses, trains, recreational vehicles and campers. The invention is also considered applicable to non-road vehicles such as hovercraft, watercraft, aircraft and components of these vehicles. It is to be understood that various modifications and variation of the specific embodiments described herein will be readily apparent to those skilled in the art in light of the above teachings without departing from the spirit and scope.

Thus, the scope of the invention should be determined by the appended claims and their legal equivalents, rather than by the examples given.

What is claimed is:

1. An aerodynamic device for reducing drag on a ground vehicle, comprising:
   a first pair of rigid panels attached to the left side of the bottom surface of the vehicle and extending downward from the vehicle, including an outer panel substantially coplanar with the left surface of the vehicle and an inner panel located inboard of the outer panel and separated from the outer panel by a horizontal distance;
   a second pair of rigid panels attached to the right side of the bottom surface of the vehicle and extending downward from the vehicle, including an outer panel substantially coplanar with the right surface of the vehicle and an inner panel located inboard of the outer panel and separated from the outer panel by a horizontal distance;
   wherein the first and second pairs of rigid panels are configured with each panel extending downward from the vehicle a desired vertical distance and having a lower edge that is aerodynamically sharp; and
   wherein each of the horizontal and vertical distances are configured so as to form a first and second inverted U-shaped channel open to the downward direction, with the panels configured to generate a vortex within the channel when the ground vehicle is in motion, wherein the vortex has an axis of rotation aligned with the direction of motion of the ground vehicle.

2. The aerodynamic device of claim 1, wherein one or more of the panels on the left or right side of the vehicle is comprised of multiple longitudinal segments.

3. The aerodynamic device of claim 1, wherein each panel extends downward from the vehicle a distance of less than about 90% of the distance from the bottom surface of the vehicle to the surface that the vehicle is moving over.

4. The aerodynamic device of claim 1, wherein each panel of at least one of the first pair or second pair extends downward a substantially equal distance from the bottom surface of the vehicle.

5. The aerodynamic device of claim 1, wherein at least one panel extends downward a distance that varies along its length.

6. The aerodynamic device of claim 1, wherein at least one of the first or second pairs of panels are integrally connected to each other by a horizontal panel.

7. The aerodynamic device of claim 1, wherein at least one of the first or second pairs of panels is an integral extension of the side surface of the vehicle.

8. The aerodynamic device of claim 1, wherein at least one of the first or second pairs of panels further comprises a horizontal panel located between the outer and inner panels and that is separate from the pair of panels.

9. The aerodynamic device of claim 1, wherein at least one panel has a swept leading edge.

10. The aerodynamic device of claim 1, wherein at least one of the first or second pairs of panels is connected to the vehicle such that the panels may be folded so as to be substantially adjacent and proximate the bottom surface of the vehicle when not in use.

11. The aerodynamic device of claim 1, wherein at least one of the first or second pairs of panels is slidably connected to the vehicle such that the panels slide longitudinally along the vehicle.

12. The aerodynamic device of claim 1, wherein the distance between at least one of the first or second pairs of panels is adjustable.

13. The aerodynamic device of claim 1, wherein at least one of the first or second pairs of panels further comprises one or more additional panels inboard of the pair of panels.

14. An aerodynamic device for reducing drag on a ground vehicle comprising:
   a first pair of rigid panels comprised of one or more longitudinal segments attached to the left side of the bottom surface of the vehicle and extending downward from the vehicle, including an outer panel substantially coplanar with the left surface of the vehicle, an inner panel located inboard of the outer panel, and a horizontal panel between the outer and inner panels with the horizontal panel separating the outer and inner panels by a horizontal distance;
   a second pair of rigid panels comprised of one or more longitudinal segments attached to the right side of the bottom surface of the vehicle and extending downward from the vehicle, including an outer panel substantially coplanar with the left surface of the vehicle, an inner panel located inboard of the outer panel, and a horizontal panel between the outer and inner panels with the horizontal panel separating the outer and inner panels by a horizontal distance; and
   wherein the first and second pairs of rigid panels are configured with each panel extending downward from the vehicle a vertical distance and with each horizontal distance so as to form a first and second channel open to the downward direction with the panels configured to generate a vortex within the channel when the ground vehicle is in motion, wherein the vortex has an axis of rotation aligned with the direction of motion of the ground vehicle.

15. The aerodynamic device of claim 14, wherein each panel extends downward from the vehicle a distance of less than about 90% of the distance from the bottom surface of the vehicle to the surface that the vehicle is moving over.

16. The aerodynamic device of claim 14, wherein each panel of at least one of the first pair or second pair extends downward a substantially equal distance from the bottom surface of the vehicle.

17. The aerodynamic device of claim 14, wherein at least one panel extends downward a distance that varies along its length.

18. The aerodynamic device of claim 14, wherein at least one of the first or second pairs of panels are integrally connected to each other by a horizontal panel.

19. The aerodynamic device of claim 14, wherein at least one of the first or second pairs of panels is connected to the vehicle such that the panels may be folded so as to be substantially adjacent and proximate the bottom surface of the vehicle when not in use.

20. The aerodynamic device of claim 14, wherein at least one of the first or second pairs of panels is slidably connected to the vehicle such that the panels slide longitudinally along the vehicle.

* * * * *